E. J. EVANS AND G. E. HEMPHILL.
WRENCH.
APPLICATION FILED MAR. 2, 1921.
1,391,180.
Patented Sept. 20, 1921.
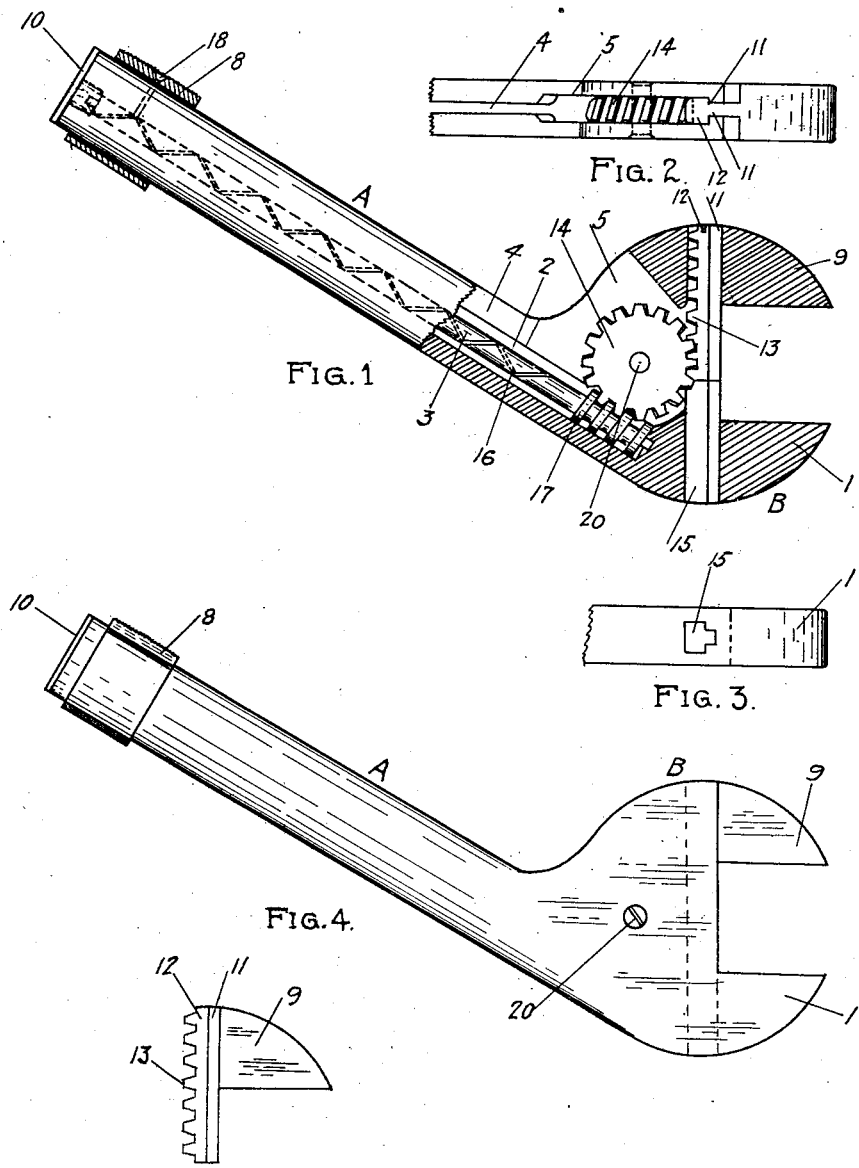

UNITED STATES PATENT OFFICE.

EDWIN J. EVANS AND GEORGE E. HEMPHILL, OF SALT LAKE CITY, UTAH, ASSIGNORS TO UNIVERSAL TOOL COMPANY, A CORPORATION OF UTAH.

WRENCH.

1,391,180.  Specification of Letters Patent.  Patented Sept. 20, 1921.

Application filed March 2, 1921. Serial No. 449,167.

*To all whom it may concern:*

Be it known that we, EDWIN J. EVANS and GEORGE E. HEMPHILL, citizens of the United States, residing at Salt Lake City, in the county of Salt Lake and State of Utah, have invented certain new and useful Improvements in Wrenches, of which the following is a specification.

Our invention relates to wrenches, and has for its object to provide a simple wrench having angled jaws which may be adjusted to fit nuts of different sizes by new and novel adjusting means.

These objects we accomplish with the device illustrated in the accompanying drawings in which similar letters and numerals of reference indicate like parts throughout the several views, and as described in the specification forming a part of this application and pointed out in the appended claim.

Figure 1 is a longitudinal section of the wrench in the plane of the jaws, portions shown in elevation. Fig. 2 is an edge view of the head portion of the wrench, showing the slot through which the worm gear is received with the worm gear in place therein. Fig. 3 is an edge view of the portion of the head which form the stationary jaw. Fig. 4 is an elevation of the wrench. Fig. 5 is a side elevation of the movable jaw.

We use the spiral screw principle commonly used in certain screw drivers and wrenches to adjust our movable jaw, and the invention consists in the combination of parts and the changes in construction of the spiral screw to meet the requirements of a wrench having angled jaws. As shown in the drawings the shank A has a head B set at an angle relative to the shank with a portion of said head forming an integral fixed jaw 1. The said shank A is centrally bored, as at 2, to form a case for the differential spindle 3, which spindle has end bearings at each end. The said shank A is slotted from end to end, as at 4, which slot opens to the interior bore 2, and has a portion recessed, as at 5, to receive the worm gear 14. The head adjacent the said jaw 1 is bored to form an end bearing for the spindle 3, and said head is also perforated or recessed by a transverse guide slot or race 15 in line with and conforming with the rack bar and the guide flanges of the movable jaw. The said shank A is internally threaded at its free end to receive a bearing nut cap 10 for the end of the differential spindle 3, and said shank is given an ovoid form in cross section to form the handle of the wrench, and on said handle is carried the operating sleeve 8. The said shank head is interiorly recessed to form the worm gear socket opening to slot 5. The movable jaw 9 has an integral web portion 11 extending away from the jaw, a portion of which web is widened or flanged, as at 12, and herein designated as guide flanges, and which web and flange portions are operated in the recess or guide race 15. The face of said portion 12 is transversely threaded, as at 13, to provide a rack bar the threads of which engage with the cogs of the worm gear 14. The differential spindle 3 has a spiral groove 16 cut into its periphery from the bearing portion, which engages in the bearing nut cap 10, to near the end of said slot 4 of the shank, with the pitch of the grooves about one inch to each convolution, also a worm pinion 17 is cut on the other end of said spindle 3, and with its pitch of teeth much greater than the pitch of the groove 16, preferably about five convolutions to the inch. A radially disposed pin 18 is fastened in said sleeve 8 with its inner end engaging in said groove 16, and the threads of the worm pinion 17 engage in the teeth of the worm gear 14 while the teeth of the worm gear engage the teeth of the rack bar on flange 12 of the movable jaw 9.

We thus provide a wrench which may be constructed in accordance with our invention to have an end engagement or an angled engagement of any angle up to a right angle, and which has but few parts and is assembled by inserting the differential spindle 3 within the bore 2 of the shank A, and the worm gear 14 through the slot 5 of the shank and head and journaling it in the head by the tap screw 20. Then insert the portions 11 and 12 of the movable jaw 9 into the recess 15 with the threads 13 engaging with the teeth of the worm gear 14, and when the two jaws are contiguous the bearing nut cap 10 is screwed into place on the end of the shank. The sleeve 8 is then placed on the shank A and the pin 18 screwed into place with its inner end engaging in the spiral groove 16 of the differential spindle 3. The jaw 9 is moved relative to the jaw 1 by slipping the sleeve 8 along the shank A. The difference of the pitch of the groove 16 and threads 17 of the worm portion will allow a five or six inch movement of the sleeve while the jaw 9 will be moved only about one inch, thus providing the adjustment of the jaws by the rotation of the spindle 3, and the engagement of the teeth of the worm gear 14 with both the rack of the jaw and the teeth of the worm pinion 17 will hold the jaws in fixed relation to each other.

Having thus described our invention we desire to secure by Letters Patent and claim—

A wrench comprising a centrally bored shank with a longitudinal slot opening into said bore; an angularly disposed head integral with said shank and having one portion formed as a jaw; there being a guide recess cut through said head at an acute angle and connected with the bore of said shank; a movable jaw having a flanged web portion operable in said guide recess; a rack bar on the web portion of said movable jaw; a spirally grooved spindle carried in the bore of said shank; a worm pinion formed on one end portion of said spindle; a worm gear journaled in said head with its teeth engaging said worm pinion and rack bar; a sleeve slidable on said shank; and a pin carried in said sleeve with its inner end engaged in the groove of said spindle.

In testimony whereof we have affixed our signatures.

EDWIN J. EVANS.
GEORGE E. HEMPHILL.